(12) United States Patent
Olalde et al.

(10) Patent No.: US 9,829,215 B2
(45) Date of Patent: Nov. 28, 2017

(54) TEXTURED MODULAR SOLAR SURFACE RECEPTOR OPERATING AT A HIGH TEMPERATURE

(75) Inventors: Gabriel Olalde, Odeillo (FR); Gilles Flamant, Llo (FR); Xavier Daguenet, Pfaffenheim (FR); Adrien Toutant, Villeneuve de la Raho (FR); Jean-Marc Foucaut, Lesquin (FR); Sébastien Coudert, La Madeleine (FR)

(73) Assignee: CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 657 days.

(21) Appl. No.: 13/501,449

(22) PCT Filed: Oct. 12, 2010

(86) PCT No.: PCT/EP2010/065251
§ 371 (c)(1),
(2), (4) Date: Jun. 28, 2012

(87) PCT Pub. No.: WO2011/045301
PCT Pub. Date: Apr. 21, 2011

(65) Prior Publication Data
US 2012/0260909 A1 Oct. 18, 2012

(30) Foreign Application Priority Data

Oct. 14, 2009 (FR) ...................................... 09 57204

(51) Int. Cl.
F24J 2/22 (2006.01)
F24J 2/07 (2006.01)
(Continued)

(52) U.S. Cl.
CPC . *F24J 2/07* (2013.01); *F24J 2/46* (2013.01); *F24J 2/484* (2013.01);
(Continued)

(58) Field of Classification Search
CPC ........ F24J 2/484; F24J 2002/4601; F24J 2/46; F24J 2/07; Y02E 10/41
(Continued)

(56) References Cited

U.S. PATENT DOCUMENTS 4,099,513 A * 7/1978 Skrivseth ...................... 126/667
4,130,108 A * 12/1978 Patil .............................. 126/648
(Continued)

FOREIGN PATENT DOCUMENTS

FR 2865269 A1 * 7/2005 ................. F24J 2/46
FR 2 911 997 A1 8/2008
(Continued)

*Primary Examiner* — Avinash Savani
*Assistant Examiner* — Rabeeul Zuberi
(74) *Attorney, Agent, or Firm* — Blakely Sokoloff Taylor & Zafman LLP

(57) ABSTRACT

The present invention relates to a solar surface receptor module that operates at a high temperature and comprises a channel (101) extending therethrough and along which a heat transfer occurs between a fluid (liquid or gas) moving in said channel (101) and at least one wall (104) of the receptor exposed to concentrated solar radiation, characterized in that the inner surface (105) of at least said wall includes turbulence-generating actuators (110) at the fluid inlet (102). The present invention also relates to a solar receptor therefor.

18 Claims, 7 Drawing Sheets

(51) Int. Cl.
*F24J 2/46* (2006.01)
*F24J 2/48* (2006.01)
*F24J 2/00* (2014.01)

(52) U.S. Cl.
CPC .. *F24J 2002/003* (2013.01); *F24J 2002/4601* (2013.01); *F24J 2002/4603* (2013.01); *Y02E 10/41* (2013.01)

(58) Field of Classification Search
USPC .................. 126/704, 675, 667, 674, 658
See application file for complete search history.

(56) References Cited

U.S. PATENT DOCUMENTS

| | | | | |
|---|---|---|---|---|
| 4,148,300 | A * | 4/1979 | Kaufman, Sr. | 126/684 |
| 4,219,012 | A * | 8/1980 | Bergen | 126/619 |
| 4,224,927 | A * | 9/1980 | Patil | 126/675 |
| 4,265,221 | A * | 5/1981 | Whinnery | 126/591 |
| 4,266,531 | A * | 5/1981 | Behrendt et al. | 126/647 |
| 4,313,429 | A * | 2/1982 | McAlaster | 126/667 |
| 5,058,837 | A * | 10/1991 | Wheeler | 244/200.1 |
| 5,596,981 | A * | 1/1997 | Soucy | E06B 3/6612 126/569 |
| 5,851,309 | A * | 12/1998 | Kousa | 136/248 |
| 6,003,508 | A * | 12/1999 | Hoffschmidt et al. | 126/680 |
| 6,722,358 | B2 * | 4/2004 | Rhodes | 126/655 |
| 2002/0007845 | A1 * | 1/2002 | Collette | B64G 1/443 136/246 |
| 2003/0066638 | A1 * | 4/2003 | Qu | C09K 5/14 165/186 |
| 2010/0302730 | A1 * | 12/2010 | Hernon | H05K 7/20145 361/694 |

FOREIGN PATENT DOCUMENTS

WO   WO 01/61254 A1   8/2001
WO   WO 2004/023048 A1   3/2004

* cited by examiner

SPIV Mark

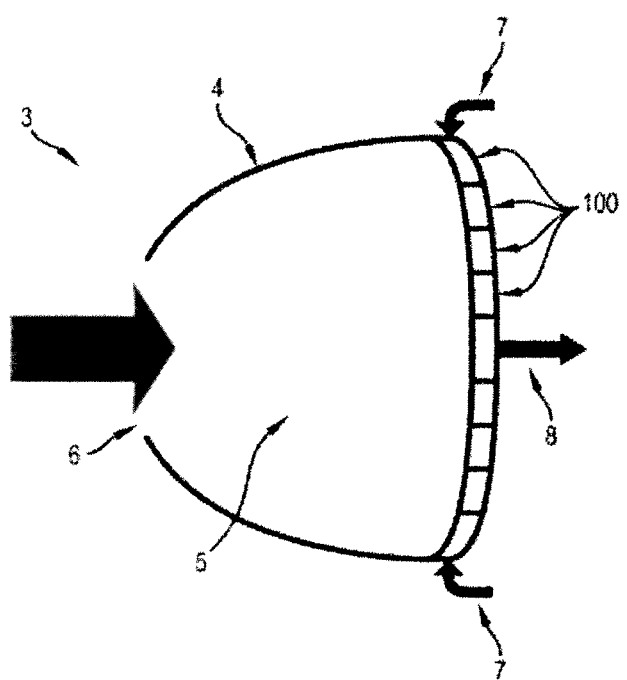

TEXTURED MODULAR SOLAR SURFACE RECEPTOR OPERATING AT A HIGH TEMPERATURE

This is a non-provisional application claiming the benefit of International Application Number PCT/EP2010/065251, filed Oct. 12, 2010.

The present invention relates to the field of solar receptors used in very high temperature thermodynamic solar systems.

These systems, also known as heliothermodynamic systems, enable the transformation of solar radiation into thermal energy. This energy may be recovered directly, or used for the generation of electricity or the supply of chemical reactions.

The most conventional of these heliothermodynamic systems is the tower power plant. Such a system is constituted of a tower and a field of moveable mirrors known as heliostats that concentrate the radiation on a reduced zone at the summit of the tower.

This zone lit by the concentrated radiation receives several hundred times the normal solar energy, and is equipped with a device known as solar receptor, the function of which is to transmit said energy to a heat-conveying fluid (a liquid or a gas) to directly or indirectly heat the air or the steam that supplies a turbine for the generation of electricity, or a chemical solution that is the seat of reactions.

In FIG. 1 is thus represented a thermodynamic tower power plant comprising the tower 1, a field of heliostats 2, and the solar receptor 3.

These receptors are key components of such power plants, because their performances are directly dependent on the aptitude of the receptors to absorb then transmit the energy of the radiation, and their cost constitutes a non-negligible part of the entire power plant. A promising branch of renewal energies, solar thermal power can only become a serious alternative to conventional electricity generation (fossil energies, nuclear, etc.) on condition that:
  excellent efficiencies are attained;
  the costs of construction and maintenance are reduced;
  it is consistent with an industrial strategy.

Various receptors have been proposed to efficiently fulfil this function.

Receptors are known to those skilled in the art using metal components that are heated under the effect of the solar radiation to which they are exposed. But said receptors cannot exceed 700° C. The efficiency thereof is limited. In addition, these conventional systems generally use a fluid based on molten salts for their good heat capacity. Furthermore, these salts are pollutants and only air or steam can be used in a turbine. An additional exchanger is required.

The document WO04023048 proposes a receptor comprising porous ceramic components irradiated by the concentrated solar radiation, through which ambient air circulates and attains very high temperatures. However, to be useable, this air needs to be pumped or needs to heat another circuit through an exchanger as in the case of molten salts, resulting in a complex design.

The documents U.S. Pat. No. 4,164,123, WO9612918 and U.S. Pat. No. 6,516,794 describe various systems of volumic solar receptors, each comprising among others a sealed chamber with a window in which a pressurised fluid traverses a porous ceramic component irradiated through the window 9, as may be seen in FIG. 2. Temperatures from 750° C. to 1000° C. may be attained, but the window is expensive and limits the reliability, and especially it does not make it possible to progress towards receptors of large size necessary for applications of several MW.

The document WO200161254 describes a volumic solar receptor module, the wall of which is hollow and filled with a porous component similar to those of the documents cited previously. This porous component increases the heat transfers of the wall, even if they remain limited, and on the condition that the module respects a very specific paraboloid shape, a direct heat transfer between the irradiated wall and the fluid circulating therein becomes possible. Nevertheless, the porous components create considerable head losses (the fluid needs to be permanently pumped, which entails an energy cost), and becomes insufficient as a heat exchanger from the moment that the module exceeds a certain size.

Despite these means known from the prior art, thermodynamic solar furnace power plants remain limited to demonstrators, and have difficulty being the subject of large projects.

Indeed, the limitations of the receptors remain very high, and even if high temperature receptors offer new perspectives, the losses, whether thermal or mechanical, in the circulation prevent thermodynamic solar energy from being competitive.

For all of these reasons, these power plants still have to be improved upon before being able to take their place among renewable energy power plants.

The present invention aims to resolve these difficulties by proposing a solar surface receptor which, through a simple modular structure, makes it possible to work at high temperature with good performances, and is compatible with an industrial size.

A subsidiary aim of the invention is to attain this objective while obtaining a cheaper system than that achieved according to the prior art.

The present invention thus relates to a solar surface receptor module that operates at high temperature, traversed by a channel along which a heat transfer occurs between a fluid (liquid or gas) moving in said channel and at least one wall of the receptor exposed to concentrated solar radiation, characterised in that the inner surface of at least one said wall includes turbulence-generating actuators at the fluid inlet.

Through this sealed absorbing module structure, an operation on gases at high pressure not requiring a window is possible. Indeed, thanks to the texturizing of the surface of the channel in which the gas circulates, particularly the actuators, turbulences are generated without significantly increasing the head losses. The vortexes of longitudinal axis thereby generated increase very considerably the level of turbulence and thus the convective transfers between the gas and the wall directly exposed to the concentrated solar radiation. The absorption of energy is surfacic and not volumic as in the systems of the prior art.

In addition, the module according to the present invention is a simple system that directly fulfils the functions of heat exchanger while being free of the mechanical losses due for example to the crossing of a porous component.

According to other advantageous and non limiting characteristics of the invention:
  the module comprises riblets situated along the flow downstream of the actuators to channel the turbulences and reduce friction;
  the actuators are fins forming a slight angle with the axis of flow and having a leading edge starting from the surface and moving away from it while following the flow;
  the actuators are rectangle triangles orthogonal to the surface;

the actuators are oriented alternately on either side of the axis of flow according to a contra-rotating arrangement;

the actuators have a height comprised between ⅓ and ⅔ of the length of their base, preferentially half;

the angle of said actuators with the axis of flow is in absolute value comprised between 10° and 20°, preferentially 18°.

the distance between two sets of two actuators lies between 1.5 and 2.5 times the length of their base, preferentially double;

the riblets are parallel structures extending longitudinally along the flow;

the riblets are parallelepipedal profiles;

the riblets are demi-cylindrical channels;

the riblets are prismatic profiles of triangular section;

the riblets are bevelled upstream;

the angle of said bevel of the riblets is less than 7°;

the gap between the axis of two consecutive riblets is a multiple of the height of the actuators;

the module comprises a riblet aligned with the median axis between each pair of actuators;

the module comprises a riblet aligned with the downstream end of each actuator;

the gap along the direction of flow between the end of the actuators and the start of the riblets lies between one and three times the height of the actuators, preferentially twice;

the actuators and the riblets define a unique vein without subdivisions to better distribute the flow;

the module is constituted of a U-shaped block covered with a lid connected in a sealed manner, and inlet and outlet end pieces.

the module is made of ceramic, preferentially silicon carbide.

said actuators and riblets are formed by machining of the block.

Another aspect of the invention relates solar receptor, characterised in that it comprises a thermally insulating reflecting shield delimiting a volume, the bottom of which is constituted of the exposed wall of at least one module according to one or more of the preceding characteristics, and an opening facing said bottom.

This system does not have the constraint of the window limiting its size, since only the opening in the structure of the thermal shield is necessary, a module being sealed. Such an architecture enables the design of a power plant of high power (several tens of MW) for a reasonable cost.

Other characteristics and advantages of the present invention will become clearer on reading the description that follows of a preferential embodiment. This description will be given with reference to the appended drawings, in which:

FIG. 1 described previously is a diagram of a known thermodynamic solar tower power plant;

Figure 5:
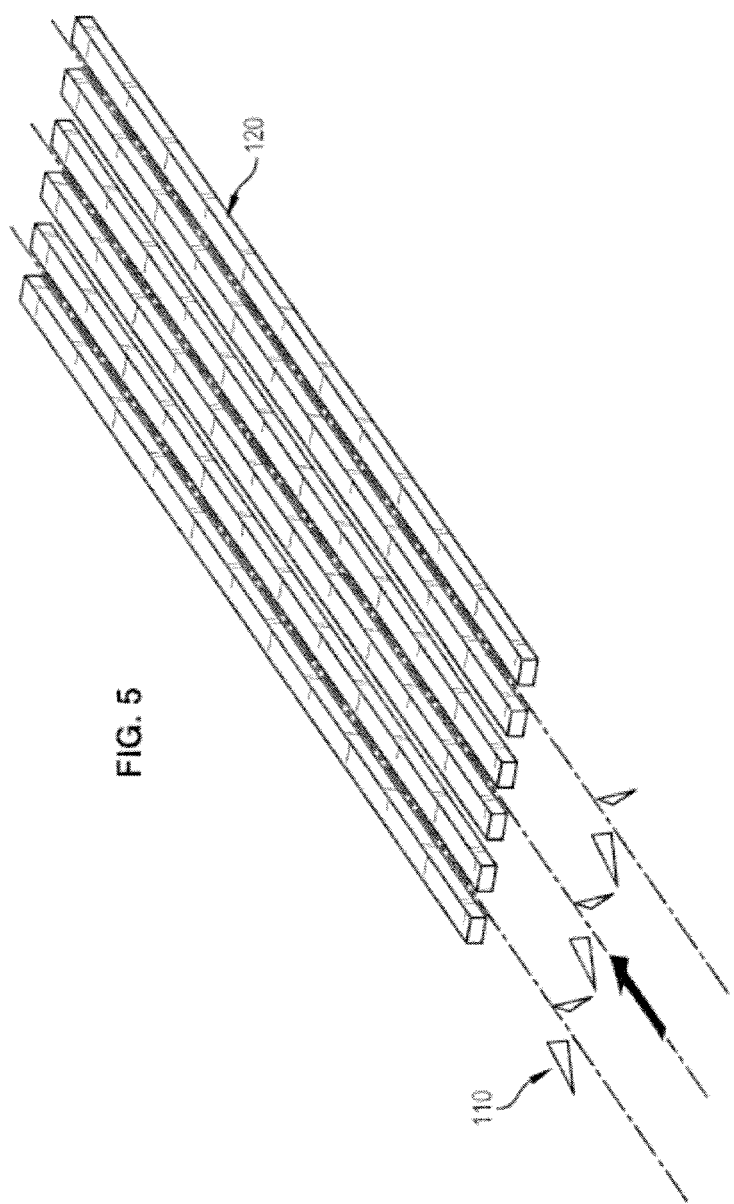
Figure 6:
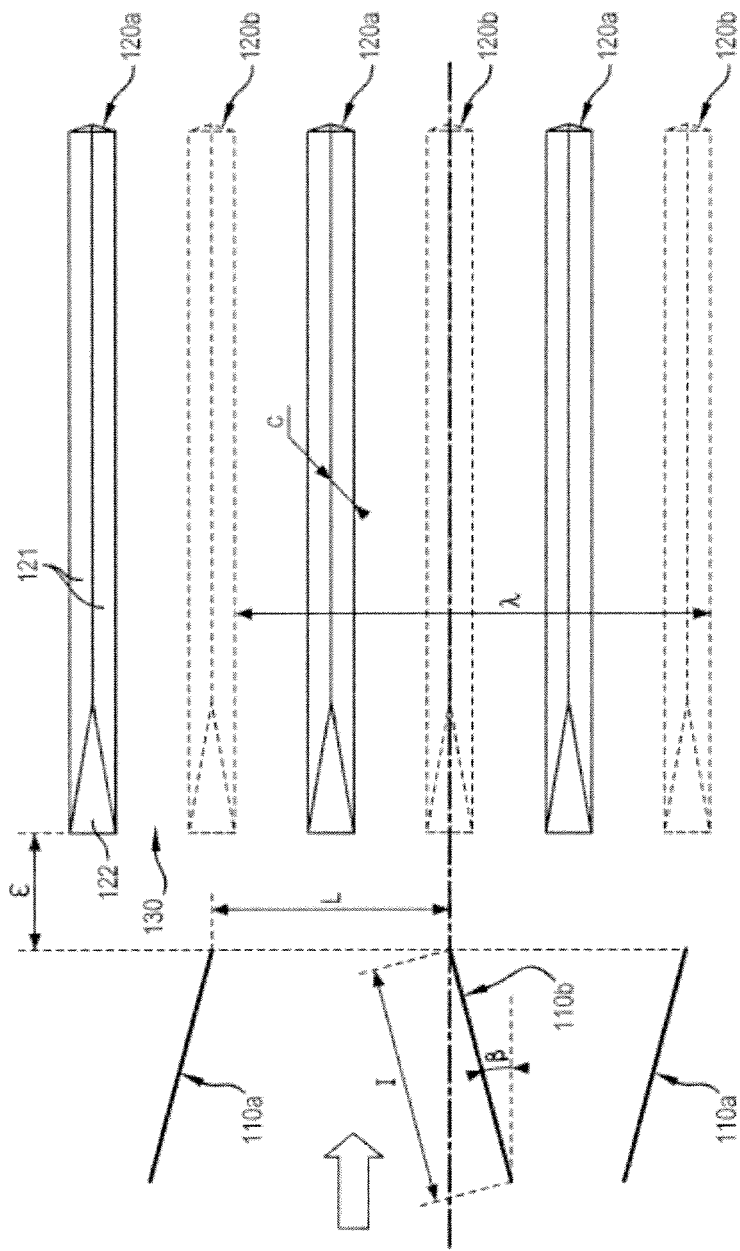
Figure 7:
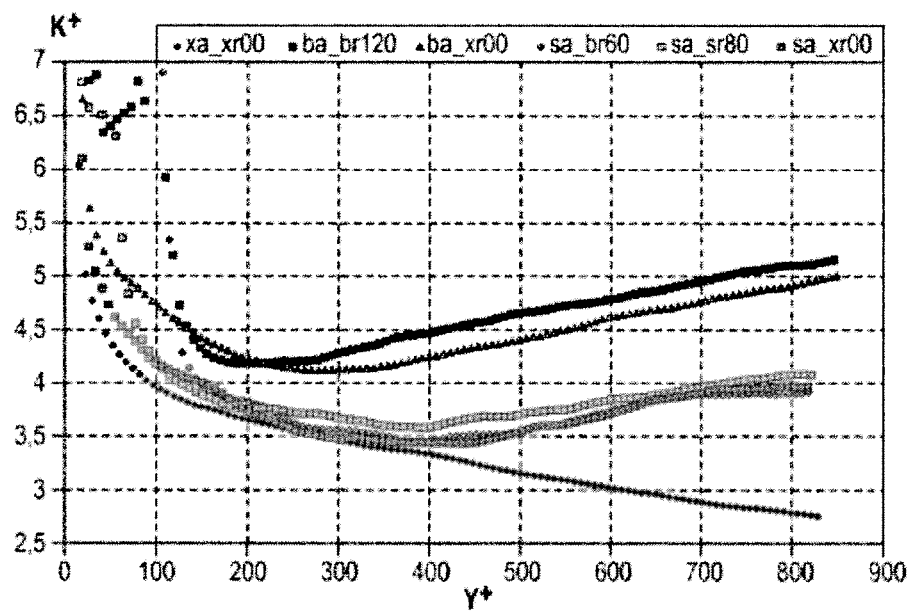
Figure 8:
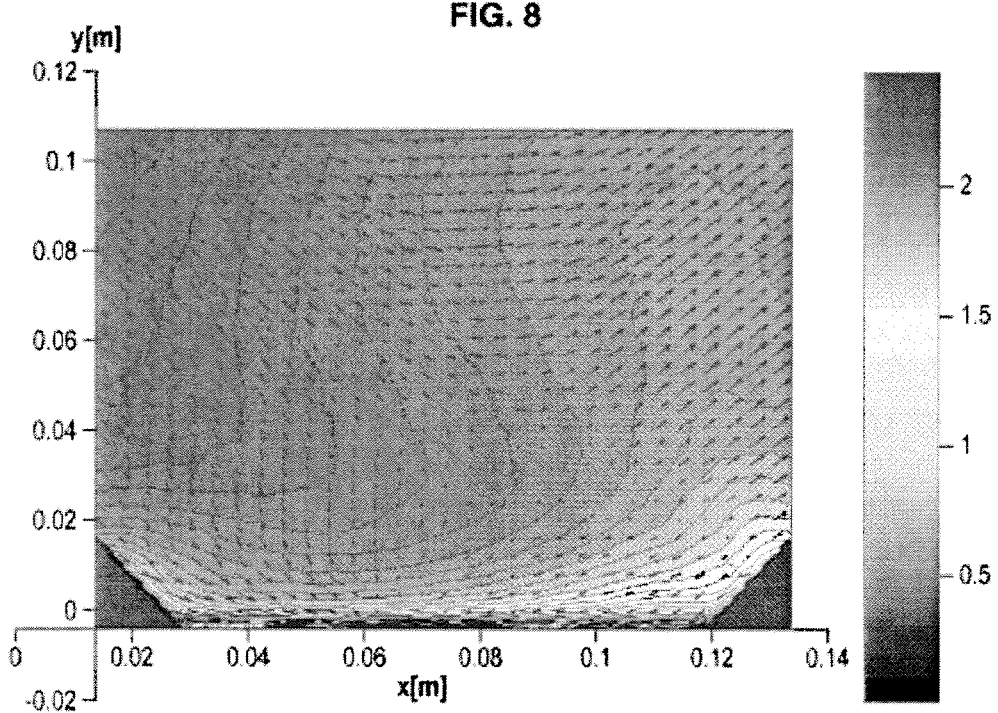

FIG. 5 schematically represents a possible combination of actuators and riblets according to the invention;

FIG. 6 is a schematic top view of a preferential structuring of the inner surface of the receptor according to the invention;

FIG. 7 is a graph representing the evolution of the dimensionless turbulent kinetic energy as a function of the dimensionless height during measurement campaigns on different geometries;

FIG. 8 is a graph representing the average velocity distribution in a profile view of a preferential structuring;

FIG. 9 is a sectional schematic view of a solar receptor according to the invention.

The module 100 according to the invention is a casing comprising a channel 101. This casing may be the subject of numerous embodiments, and advantageously has the shape of a flattened parallelepiped. In the channel 101 circulates the compressed air that is going to absorb the energy, the module being provided with an inlet 102 and an outlet 103. Hydrogen or helium may nevertheless be envisaged as heat-conveying means, as well as most gases that can supply thermochemical reactors. The module 100 may for example be the seat of steam cracking reactions. An external face 104 is that which will be turned towards the heliostats 2 in order to receive the concentrated radiation. The other side of this face, the inner surface 105, is textured.

Figure 1:
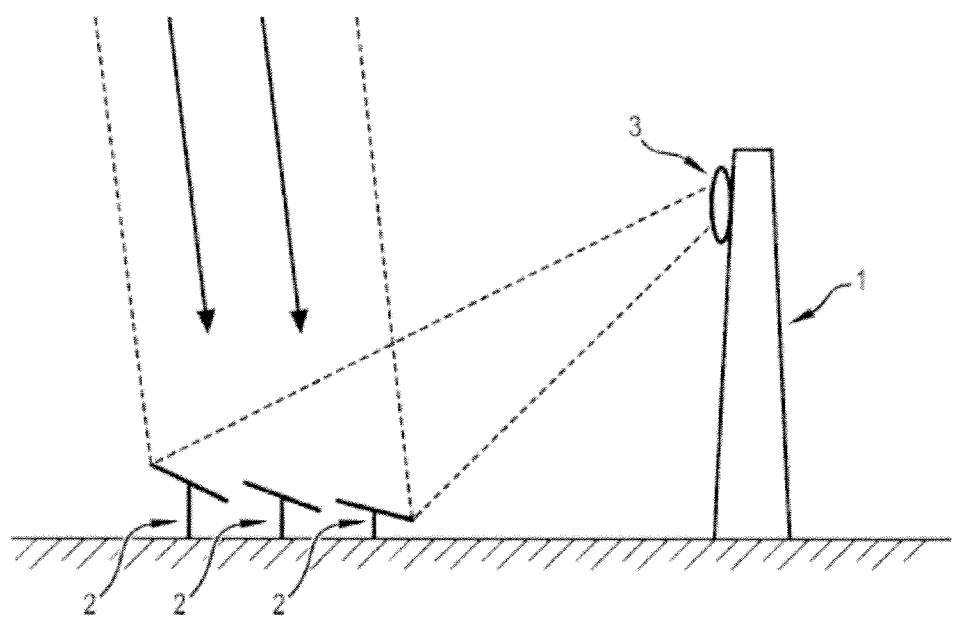
Figure 2:
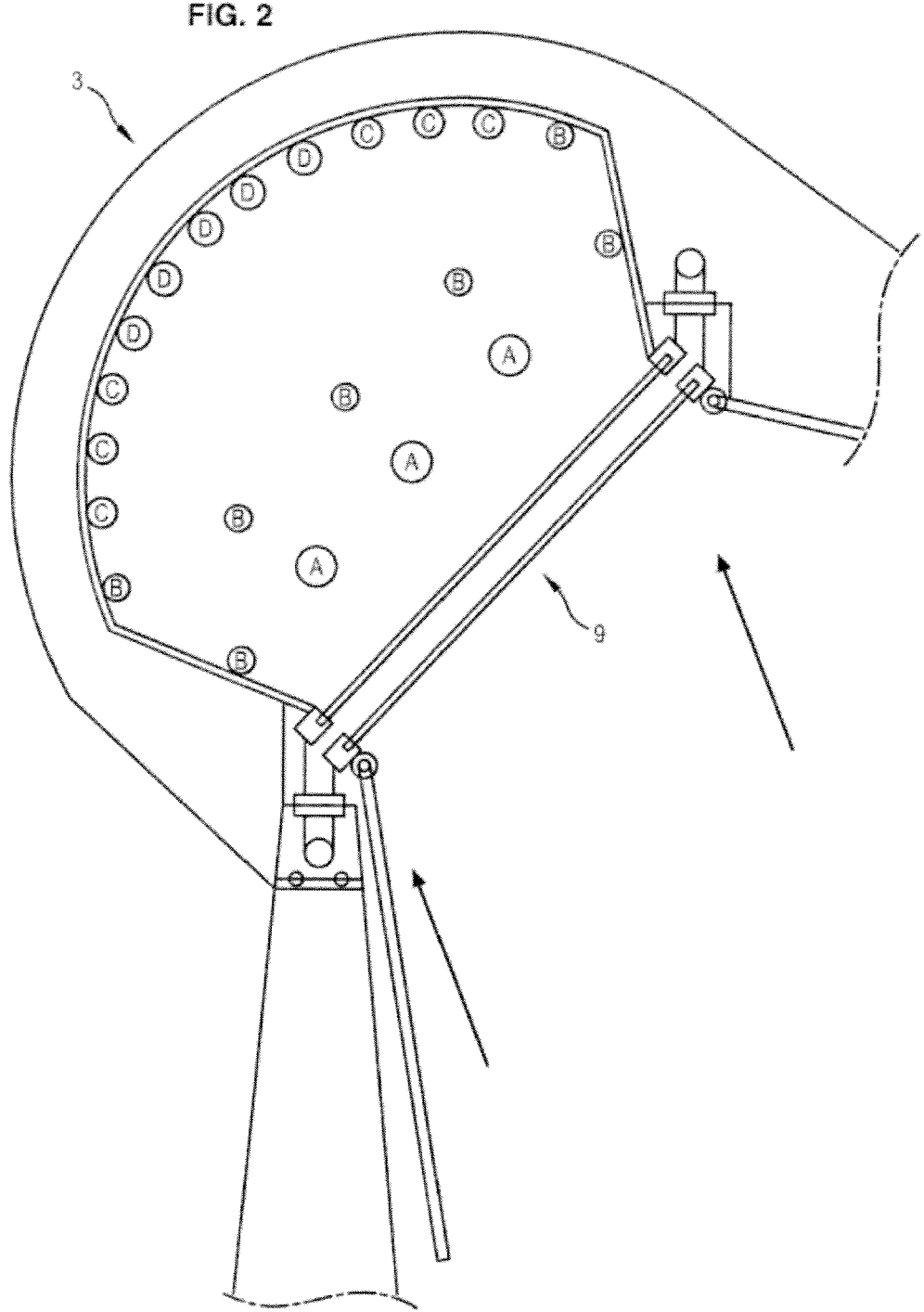
FIG. 2 is a schematic sectional view of a receptor known from the prior art.
Figure 3:
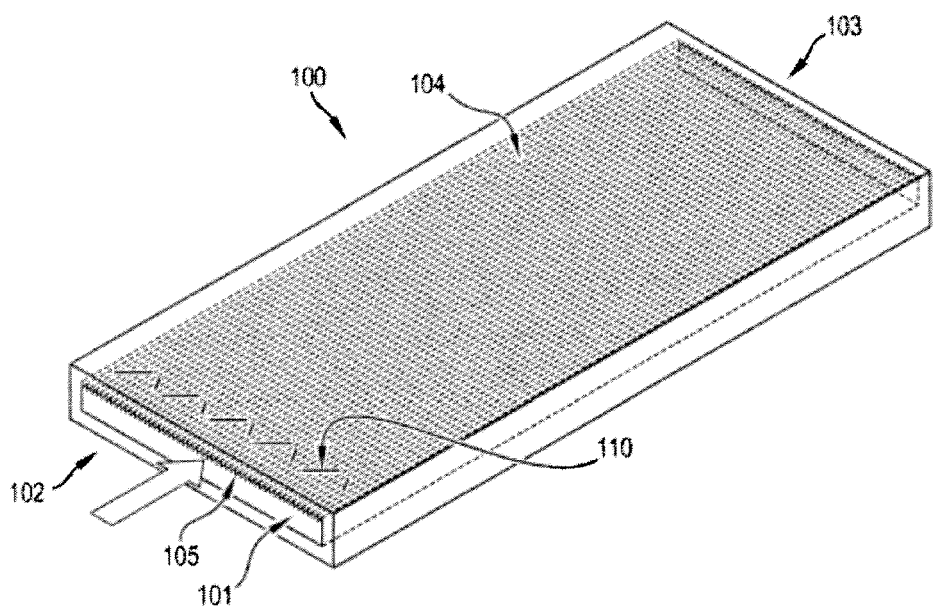
FIG. 3 is a three-dimensional perspective view of a possible module according to the invention.
Figure 4:
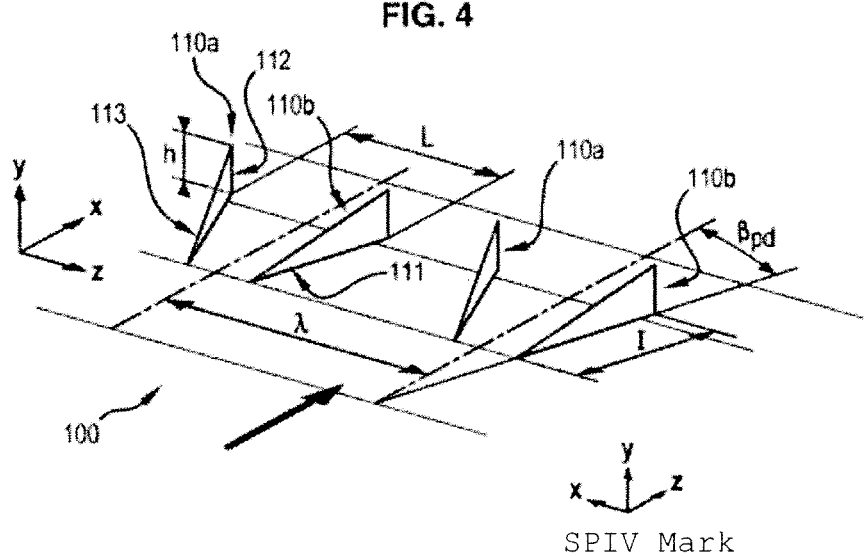
FIG. 4 is a perspective view of a possible arrangement of the actuators according to the invention.

These texturizings are composed of actuators 110, the structure of which may be seen in FIG. 4. They are arranged on an inlet strip of the channel 101. The actuators are small fins that have a deflector role. They are actually not perfectly aligned with the axis of flow and have a leading edge 113 that starts from the inner surface 105 and moves away from it while following the flow. This inclination of the actuators 110 deviates the flux, which generates a vortex of longitudinal axis at the outlet of each actuator 110.

According to a preferential but non limiting embodiment, the actuators may be of rectangle triangles shape, these being connected to the wall 105 by their base 111 of length l, the small side 112 of length h rising orthogonally to this wall 105. In this configuration, they have their bevelled side 113, which is the hypotenuse of the triangle, in the direction of the inlet 102 of the module 100. The side 112, which forms the tail of the actuator, is located in the direction of the outlet. Two consecutive actuators 110a and 110b form a pattern that is repeated through translation over the whole width of the wall according to a step λ. The actuators 110a and 110b are separated from the longitudinal axis of the module 100 or axis of flow of the fluid respectively by a small angle β and an angle −β. The opening thereby made between the two end vertical sides 112 of a pair 110a/110b of actuators has for measurement L. The alternation of the orientation of the actuators 110 leads to the alternation of the direction of rotation of the vortexes generated, the average deviation of the flux being zero. Such a geometry, known as contra-rotating, minimises the increase in head losses.

This architecture is advantageously completed by structures 120 known as riblets, an embodiment of which is represented in FIG. 5. The riblets are profiles extending along the wall 105 along the axis of flow, and situated downstream of the actuators 110 so as to define channels 130 in which the vortexes generated by the actuators are maintained along the module 100.

These vortexes tangentially sweep over the bottom of the channels 130 and the walls 121 of the riblets, greatly increasing the conductive-convective exchange coefficients between the wall 105 and the fluid circulating in the channel 101. The surface transfer becomes sufficient to absorb the energy of the concentrated radiation. In addition, the riblets 120 only oppose little surface to the flux of the fluid, and thus only slightly increase the friction of the fluid and thus the head losses.

Several shapes of riblets 120 may be envisaged, particularly prisms, parallelepipeds and hemispherical channels.

According to a preferential embodiment seen in FIG. 6, these riblets 120 are prisms having for section an isosceles rectangle triangle of side c, the hypotenuse being against the wall 115. They thus have two opposite flanks 121. The riblets 120 are separated from the tail 112 of the actuators 110 by a length $\epsilon$, and start with a part 122 bevelled according to an angle $\alpha$. This bevel 122 softens the impact of the incident flux against the section of the riblets 120. They then extend up to the tip of the module 100. Concerning their arrangement, the riblets 120 form a pattern that repeats itself through translation over the whole width of the wall according to the same step $\lambda$ as the actuators. These may be aligned with the median axis between a pair 110a/110b of consecutive actuators (riblets 120a) and/or aligned with the tails 112 of the actuators 110 (riblets 120b). Two riblets 120a or two riblets 120b are separated by a distance equal to the parameter L of gap between two tails 112 of actuators 110a/110b.

According to a first layout possibility, one only uses the riblets 120a so as not to oppose resistance to the vortexes, the axes of which are in the alignment of the tails 112. The pattern is thus composed of 2 riblets. According to a second layout possibility, the preceding structure is completed with the riblets 120b to obtain an alternating structure, the pattern thus being composed of 4 riblets. The exchange surface between the wall 105 and the fluid circulating in the channel 101 is thus increased.

Moreover, the Applicant has tested in the wind tunnel of the Laboratoire de Mécanique de Lille different values of parameters I, L, h, $\alpha$, $\beta$, $\epsilon$ and $\lambda$ and the two layouts proposed. A SPIV (Stereoscopic Particle Image Velocimetry) technique mainly using a laser and two digital cameras was used. This technique enables the measurement of three components of the instantaneous velocity of the fluid, in the form of fields in the plane.

In particular, for the real module, the properties of the flow are as follow:

Average velocity: 7.8 m·s$^{-1}$ ≤ $\bar{u}$ ≤ 15.6 m·s$^{-1}$

Reynolds:

$$50000 \leq Re = \frac{\rho \bar{u} D_h}{\mu} \leq 120000$$

for air under P=10 bars, T=400° C., $D_h$ hydraulic diameter of the module.

Given the dimensions of the vein (2×1 m$^2$), the wind tunnel of the LML cannot be considered as a flat channel (flow non established); it is a boundary layer wind tunnel.

However, in the inner zone, of thickness $$\delta = \frac{20}{100} \cdot \Delta \approx 0.3 \text{ m}$$

($\Delta$ is the thickness of the boundary layer), the equations are the same as in the case of the flat channel if one works with the same Re. For information, in NTPC (Normal Temperature and Pressure Conditions), if one considers that $\delta$ is the characteristic length, one has Re≈61000 for $\bar{u}$=3 m·s$^{-1}$, which corresponds to the range of variation of the Reynolds for the "real" module.

It is thus possible to deduce the characteristics of the flow in the real module from SPIV measurements carried out on different geometries in the wind tunnel of the LML. In order to compare the different geometries between them, two indicators have been retained: the turbulent kinetic energy K (representative of the thermal exchanges) as well as the friction velocity $u_\tau$ (representative of the head losses). The statistics files necessary for the calculation of these quantities have been established from time averaged SPIV images and along the z axis (over a length representing a half-period of the base pattern, so that the results can make it possible to compare the geometries between them).

>Definition of $u_\tau$

Given that the head losses cannot be measured directly in the flow tunnel of the LML, it was decided, from the measured data, to go up to the friction velocity $u_\tau$ (in m/s). The calculation is made possible the fact that, in the case of the wind tunnel of the LML, the shear stress is not a function of $x_2$=y and is given by:

$$\tau(x_2) = \mu \cdot \frac{\partial u_1}{\partial x_2} - \rho \cdot \langle u_1' \cdot u_2' \rangle = cste = \tau_{p1}$$

with $\tau_{p1} = \rho \cdot u_\tau^2$, $\langle u_1' \cdot u_2' \rangle$ covariance of fluctuations of the velocity along the axes $x_1$ and $x_2$ (also known as "shear stress").

>Definition of K

The formula giving the turbulent kinetic energy, directly calculable from the statistics file, is the following:

$$K = \frac{\langle u_1'^2 \rangle + \langle u_2'^2 \rangle + \langle u_3'^2 \rangle}{2},$$

with $\langle u_i'^2 \rangle$ variance of velocity fluctuations (in m$^2$/s$^2$).

FIG. 7 represents K$^+$=K/$u_\tau^2$ for the different geometries as a function of the dimensionless $$y^+ = \frac{y * u_\tau}{\nu},$$

and make it possible to demonstrate a preferential geometry for which the ratio of the energy conveyed by the turbulence K over the friction (responsible for the head losses) $u_\tau$ is maximal.

This, referenced ba_br120, corresponds to a layout such that:

the riblets 120b are absent
$\lambda$=4 h
l=2 h
$\beta$=18°
$\alpha$<7°
c=h/3
L=l
E=h At the scale of the wind tunnel, the length h retained, from which stem the other dimensions, is 60 mm, the height that it is necessary to extrapolate proportionally to the real dimensions of the module 100, which advantageously has a surface area of around 1 m$^2$ for the wall 104.

This efficiency is confirmed by the graph of FIG. 8. The components of the average velocity vector for the geometry ba_br120 are plotted in the analysis window, and the vortexing character appears clearly, as well as in other vorticity calculations performed by the Applicant.

This reasoning naturally concerns the wall 105 the other face 104 of which undergoes the concentrated solar irradiation. In addition to improving the thermodynamic performances, these structurings increase the heat exchange surface with the fluid. The actuators 110 and riblets 120 may be arranged over the whole width of the channel 101, including near to the edges. Two end demi-riblets placed in the angles may be envisaged. It is also conceivable to structure the other inner walls of the channel 101.

Preferentially but not in a limiting manner, the module 100 is derived from a block of silicon carbide, a material that it totally appropriate to the cited solar application: strong absorption in the solar spectrum (0.6-3 µm), thermal conductivity greater than metals above 1000° C., resistance to oxidation, and good mechanical strength up to temperatures of the order of 1400° C. Other high performance ceramics may be envisaged.

Such a material is firstly moulded and compressed under 2000 bars.

It then has the hardness of a chalk cake and can easily be machined with great precision. A piece is thus hollowed out in order to have a U-shape at the bottom of which the structurings are going to be formed. The actuators 110 and riblets 120 are directly cut in relief on the wall. A lid corresponding to the opposite wall covers the U to form the channel 101, the union and the sealing being assured for example by a specific brazing or SPS fritting. These techniques of forming high performance ceramics are known to those skilled in the art, and the formation of a module according to the invention is not limited to this method in particular.

Finally, it is possible to envisage the use of several modules 100, in order to obtain a structure of large size. Indeed, the concentration focal spots of solar towers are generally several meters square, and one can imagine going further in industrial applications.

A complete solar receptor 3 according to another aspect of the invention represented in FIG. 9 comprises advantageously in combination at least one elementary module 100 and an insulating reflecting shield 4. This shield 4 carpets the inside of an ogive having an opening 6 at its summit to allow the radiation to enter, and having the receptor as bottom. The inside of the ogive is called the solar cavity 5, which can attain consequent sizes thanks to the modularity of the receptor. In this cavity, the shield sends the radiation reflected back onto the walls 104 of the modules 100 to reduce to the maximum the dissipation of energy to the exterior. Multiple fluid inlets 7 supply the modules 100 with cold fluid, which comes out at very high temperature via an outlet 8 in the direction of electricity generating turbines.

The module and the solar receptor according to the invention thus enable substantial progress not just in the quality of the heat transfers but also in the reliability or construction costs. Numerous costly components and generators of losses are done away with. By virtue of its simple and robust structure which enables an innovative modularity, the invention opens the way to projects of magnitude in the field of heliothermodynamic power plants.

The invention claimed is:

1. A solar surface receptor module operating at high temperature at least equal to 400° C., traversed by a channel along which a heat transfer occurs between a fluid (liquid or gas) moving in said channel and at least one wall of the receptor exposed to concentrated solar radiation, wherein the inner surface of at least said wall comprises vortex generators at the fluid inlet, the vortex generators generating vortexes of longitudinal axis, wherein the module comprises riblets disposed along the flow downstream of the vortex generators to channel the turbulences and reduce friction, wherein said riblets are parallel structures extending longitudinally along the flow, wherein the gap between the axis of two consecutive riblets is a multiple by an integer of the height of the vortex generators, wherein said riblets are bevelled upstream, wherein the angle of said bevel of the riblets is less than 7°.

2. Module according to claim 1, characterised in that said vortex generators are fins forming a slight angle with the axis of flow and having a leading edge starting from the surface and moving away from it while following the flow.

3. Module according to claim 2, characterised in that said vortex generators are rectangle triangles orthogonal to the wall.

4. Module according to claim 2, characterised in that said vortex generators are oriented alternately on either side of the axis of flow according to a contra-rotating arrangement.

5. Module according to claim 4, characterised in that said vortex generators have a height comprised between ⅓ and ⅔ of the length of their base.

6. Module according to claim 4, characterised in that the angle of said vortex generators with the axis of flow is in absolute value comprised between 10° and 20°.

7. Module according to claim 4, characterised in that the distance between two sets of two vortex generators lies between 1.5 and 2.5 times the length of their base.

8. Module according to claim 1, characterised in that said riblets are parallelepipedal profiles.

9. Module according to claim 1, characterised in that said riblets are demi-cylindrical channels.

10. Module according to claim 1, characterised in that said riblets are triangular section prismatic profiles.

11. Module according to claim 1, characterised in that it comprises a riblet aligned with the median axis between each pair of vortex generators.

12. Module according to claim 11, characterised in that it comprises a riblet aligned with the downstream end of each vortex generator.

13. Module according to claim 1, characterized in that the gap along the direction of flow between the end of the vortex generators and the start of the riblets lies between one and three times the height of the vortex generators.

14. Module according to claim 1, characterised in that the vortex generators and the riblets define a unique vein without subdivisions to better distribute the flow.

15. Module according to claim 1, characterised in that it is constituted of a U-shaped block covered with a lid connected in a sealed manner, and inlet and outlet end pieces.

16. Module according to claim 15, characterised in that it is made of ceramic, preferentially silicon carbide.

17. Module according to claim 16, characterised in that said vortex generators and riblets are formed by machining of the block.

18. Solar receptor, characterised in that it comprises an insulating reflecting shield delimiting a volume, the bottom of which is constituted of the exposed wall of at least one module according to claim 1, and an opening facing said bottom.

* * * * *